US008654049B2

(12) United States Patent
Itoh

(10) Patent No.: US 8,654,049 B2
(45) Date of Patent: Feb. 18, 2014

(54) LIQUID CRYSTAL DISPLAY DEVICE

(75) Inventor: Masatoshi Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 13/148,519

(22) PCT Filed: Feb. 5, 2010

(86) PCT No.: PCT/JP2010/000707
§ 371 (c)(1),
(2), (4) Date: Aug. 9, 2011

(87) PCT Pub. No.: WO2010/090039
PCT Pub. Date: Aug. 12, 2010

(65) Prior Publication Data
US 2011/0304526 A1  Dec. 15, 2011

(30) Foreign Application Priority Data

Feb. 9, 2009  (JP) ................................ 2009-027400
Jun. 19, 2009  (JP) ................................ 2009-146634

(51) Int. Cl.
*G09G 3/36* (2006.01)
(52) U.S. Cl.
USPC .................................. 345/87; 345/95; 345/55
(58) Field of Classification Search
USPC .............................................. 345/87, 95, 55
See application file for complete search history.

(56) References Cited

U.S. PATENT DOCUMENTS 6,195,140 B1 * 2/2001 Kubo et al. ..................... 349/44
2003/0048401 A1  3/2003 Hanaoka et al.

(Continued)

FOREIGN PATENT DOCUMENTS

CN   1530697 A   9/2004
JP   11-316382   11/1999

(Continued)

OTHER PUBLICATIONS

M. Kubo, et al., "Development of High-Performance ASV-LCDs Using Continuous Pinwheel Alignment (CPA) Mode," English Version of Sharp Technical Journal, No. 80, Aug. 2001, pp. 11-14.

(Continued)

*Primary Examiner* — William Boddie
*Assistant Examiner* — Leonid Shapiro
(74) *Attorney, Agent, or Firm* — Nixon & Vanderhye P.C.

(57) ABSTRACT

Each of pixels of a liquid crystal display device according to the present invention includes a reflective region R and a transmissive region T. A pixel electrode 14 includes a reflective pixel electrode 15 and a transparent pixel electrode 14. The liquid crystal display device includes a pair of vertical alignment films 32a, 32b respectively provided between the pixel electrode 14 and a liquid crystal layer 42 and between a counter electrode 24 and the liquid crystal layer 42; and a pair of alignment sustaining layers 34a, 34b respectively provided on surfaces of the pair of vertical alignment films on the liquid crystal layer side and formed of a photopolymerization product. The first substrate or the second substrate has a plurality of protrusions 23A provided in correspondence with the reflective regions of the plurality of pixels and protruding toward the liquid crystal layer. Regarding any row, a distance between two protrusions adjacent to each other in a row direction is larger than a distance between two pixels adjacent to each other. According to the present invention, a transreflective type liquid crystal display device having a multi-gap structure, in which light spots are not generated even when the PSA technology is applied, is provided.

8 Claims, 8 Drawing Sheets

(56) References Cited

U.S. PATENT DOCUMENTS

| | | |
|---|---|---|
| 2004/0212763 A1 | 10/2004 | Tsuchiya |
| 2006/0055858 A1 | 3/2006 | Nakanishi et al. |
| 2007/0024561 A1* | 2/2007 | Hanaoka et al. ............... 345/95 |
| 2007/0296908 A1* | 12/2007 | Koyama ....................... 349/156 |
| 2008/0180614 A1 | 7/2008 | Yoon |
| 2009/0207357 A1 | 8/2009 | Tashiro et al. |

FOREIGN PATENT DOCUMENTS

| | | |
|---|---|---|
| JP | 2002-357830 | 12/2002 |
| JP | 2005-084593 | 3/2005 |
| JP | 2006-078968 | 3/2006 |
| JP | 2006-208995 | 8/2006 |
| JP | 2008-129325 | 6/2008 |
| JP | 2008-145806 | 6/2008 |
| JP | 2008-186016 | 8/2008 |
| WO | WO 2008/018213 | 2/2008 |

OTHER PUBLICATIONS

English Translation of the International Preliminary Report on Patentability issued in International Application No. PCT/JP2010/000707, dated Feb. 5, 2010.

K. Hanaoka, et al., "40.1: A New MVA-LCD by Polymer Sustained Alignment Technology," SID 04 Digest, 2004, pp. 1200-1203.

* cited by examiner (a)

(b)

(a)

(b)

(a)

(b)

600nm (a)

(b)

US 8,654,049 B2

LIQUID CRYSTAL DISPLAY DEVICE

This application is the U.S. national phase of International Application No. PCT/JP2010/000707, filed 5 Feb. 2010, which designated the U.S. and claims priority to JP Application No. 2009-027400, filed 9 Feb. 2009; and JP Application No. 2009-146634, filed 19 Jun. 2009, the entire contents of each of which are hereby incorporated by reference.

TECHNICAL FIELD

The present invention relates to a liquid crystal display device, and specifically to a transmission-reflection combination type liquid crystal display device.

BACKGROUND ART

A liquid crystal display device including a reflective region in which pixels each provide display in a reflection mode and a transmissive region in which pixels each provide display in a reflection mode is referred to as a transmission-reflection combination type or transreflective type liquid crystal display device. A transreflective type liquid crystal display device includes a backlight, and can provide transmission mode display using light from the backlight and reflection mode display using ambient light at the same time or provide either type of display in a switched manner. Such a transreflective type liquid crystal display device is widely used especially as a small or medium size display device for mobile apparatuses used outdoors.

The transreflective type liquid crystal display device conventionally adopts a structure in which a liquid crystal layer has a smaller thickness in the reflective region than in the transmissive region (occasionally referred to as the "multi-gap structure") in order to improve the display quality in the reflection mode and the transmission mode. It is most preferable that the thickness of the liquid crystal layer in the reflective region is ½ of the thickness of the liquid crystal layer in the transmissive region. Light which contributes to the display in the reflection mode passes the liquid crystal layer twice. Therefore, by setting the thickness of the liquid crystal layer in the reflective region to ½ of the thickness of the liquid crystal layer in the transmissive region, the retardation caused by the liquid crystal layer to the light used for the display in the reflection mode matches the retardation caused by the liquid crystal layer to the light used for the display in the transmission mode. As a result, a voltage-luminance characteristic which is optimum for both of the reflective region and the transmissive region is obtained.

In a transreflective type liquid crystal display device of a multi-gap structure, a step is formed in the pixel in order to reduce the thickness of the liquid crystal layer in the reflective region. For example, with the structure described in Patent Document 1, an interlayer insulating layer is provided below a reflective electrode in a TFT substrate, and thus the thickness of the liquid crystal layer in the reflective region is made smaller than the thickness of the liquid crystal layer in the transmissive region by the thickness of the interlayer insulating layer. By contrast, a structure in which the thickness of the liquid crystal layer in the reflective region is reduced by providing a transparent resin layer in the reflective region of a color filter substrate, which is located on the viewer side of the liquid crystal layer so as to face TFTs, is also known (e.g., Patent Document 2).

Meanwhile, as a technology for controlling pretilt directions of liquid crystal molecules, Polymer Sustained Alignment Technology (hereinafter, referred to as the "PSA technology") has been recently developed (see Patent Documents 3 and 4, and Non-patent Document 1). The PSA technology is as follows. A small amount of polymerizable material (e.g., a photopolymerizable monomer) is incorporated into the liquid crystal material. After a liquid crystal cell is assembled, the polymerizable material is irradiated with an active energy beam (e.g., ultraviolet rays) in the state where a prescribed level of voltage is applied to the liquid crystal layer. By the generated polymerization product, the pretilt directions of the liquid crystal molecules are controlled. The alignment state of the liquid crystal molecules at the time when the polymerization product is generated is sustained (stored) even after the voltage is removed (in the absence of the applied voltage). Accordingly, the PSA technology has an advantage of capable of adjusting the pretilt azimuths and the pretilt angles of the liquid crystal molecules by controlling the electric field or the like formed in the liquid crystal layer. In addition, the PSA technology does not require rubbing and so is especially suitable for a liquid crystal layer of a vertical alignment type, in which the pretilt directions cannot be easily controlled by rubbing. Patent Documents 1 through 4 and Non-patent Document 1 are entirely incorporated herein by reference.

CITATION LIST

Patent Literature

Patent Document 1: Japanese Laid-Open Patent Publication No. 11-316382
Patent Document 2: Japanese Laid-Open Patent Publication No. 2005-84593
Patent Document 3: Japanese Laid-Open Patent Publication No. 2002-357830
Patent Document 4: Japanese Laid-Open Patent Publication No. 2006-78968

Non-Patent Literature

Non-patent Document 1: K. Hanaoka et al., "A New MVA-LCD by Polymer Sustained Alignment Technology", SID 04 DIGEST 1200-1203 (2004)

SUMMARY OF INVENTION

Technical Problem

As a result of applying the PSA technology to a transreflective type liquid crystal display device of a vertical alignment mode, the present inventor found a problem that the polymerization product which is to form an alignment sustaining layer is generated nonuniformly and so light spots or stains are generated. As a result of performing investigations, the present inventor found that this problem is caused by the multi-gap structure as described later.

The present invention, made in order to solve the above-described problem, has an object of providing a transreflective type liquid crystal display device of a multi-gap structure, which does not generate light spots or stains even when the PSA technology is adopted.

Solution to Problem

A liquid crystal display device according to the present invention includes a plurality of pixels arranged in a matrix having rows and columns, each of the plurality of pixels having a reflective region for providing display in a reflection mode and a transmissive region for providing display in a transmission mode. The liquid crystal display device comprises a first substrate and a second substrate; a liquid crystal layer provided between the first substrate and the a second substrate; pixel electrodes formed on the first substrate on the liquid crystal layer side and each including a reflective pixel electrode and a transparent pixel electrode; a counter electrode formed on the second substrate on the liquid crystal layer side; a pair of vertical alignment films respectively provided between the pixel electrodes and the liquid crystal layer and between the counter electrode and the liquid crystal layer; and a pair of alignment sustaining layers respectively provided on surfaces of the pair of vertical alignment films on the liquid crystal layer side, the pair of alignment sustaining layers being formed of a photopolymerization product. The first substrate or the second substrate includes a plurality of protrusions provided in correspondence with the reflective regions of the plurality of pixels and protruding toward the liquid crystal layer; and regarding any of the rows, a distance between two of the plurality of protrusions adjacent to each other in a row direction is larger than a distance between two of the plurality of pixels adjacent to each other in the row direction.

In an embodiment, each of the plurality of protrusions is provided in correspondence with either one of the plurality of pixels. Namely, one protrusion is provided for one pixel.

In an embodiment, each of the plurality of protrusions is provided in correspondence with at least two pixels adjacent to each other among the plurality of pixels. For example, each of the plurality of protrusions is provided in correspondence with two or more pixels which form a color display pixel. Note that it is preferable that each of the plurality of protrusions is provided in correspondence with less than five pixels arranged in the row direction.

In an embodiment, it is preferable that a distance between any two protrusions adjacent to each other among the plurality of protrusions exceeds ⅕ of a pitch of the plurality of pixels in the row direction.

In an embodiment, two of the plurality of protrusions provided in correspondence with two pixels adjacent to each other in the row direction among the plurality of pixels are provided as being shifted with respect to each other in a column direction so as not to be adjacent to each other in the row direction. In this case, it is preferable that a width of each of the plurality of protrusions in the row direction is equal to, or larger than, the pitch of the plurality of pixels in the row direction.

In an embodiment, the plurality of protrusions are formed of a transparent resin layer provided on the second substrate.

In an embodiment, the plurality of protrusions are formed of a resin layer provided on the first substrate. For example, the resin layer is provided between the reflective pixel electrode and the first substrate.

In an embodiment, the liquid crystal layer in the reflective region has a thickness which is 0.3 times or greater and less than 0.6 times a thickness of the liquid crystal layer in the transmissive region.

Advantageous Effects of Invention

According to the present invention, a transreflective type liquid crystal display device of a multi-gap structure, which does not generate light spots or stains even when the PSA technology is adopted, is provided.

BRIEF DESCRIPTION OF DRAWINGS

FIG. 7(a) shows a black display state (in the absence of an applied voltage), and FIG. 7(b) shows a white display state (in the presence of an applied voltage).

FIG. 8(a) shows a black display state (in the absence of an applied voltage), and FIG. 8(b) shows a white display state (in the presence of an applied voltage).

DESCRIPTION OF EMBODIMENTS

Hereinafter, a transreflective type liquid crystal display device in an embodiment according to the present invention will be described with reference to the drawings. A liquid crystal display device in an embodiment according to the present invention is, for example, a TFT-type liquid crystal display device including a plurality of pixels arranged in a matrix having rows and columns.

First, with reference to FIG. 1 and FIG. 2, a structure of a liquid crystal display device 100A in an embodiment according to the present invention will be described.

Figure 1:
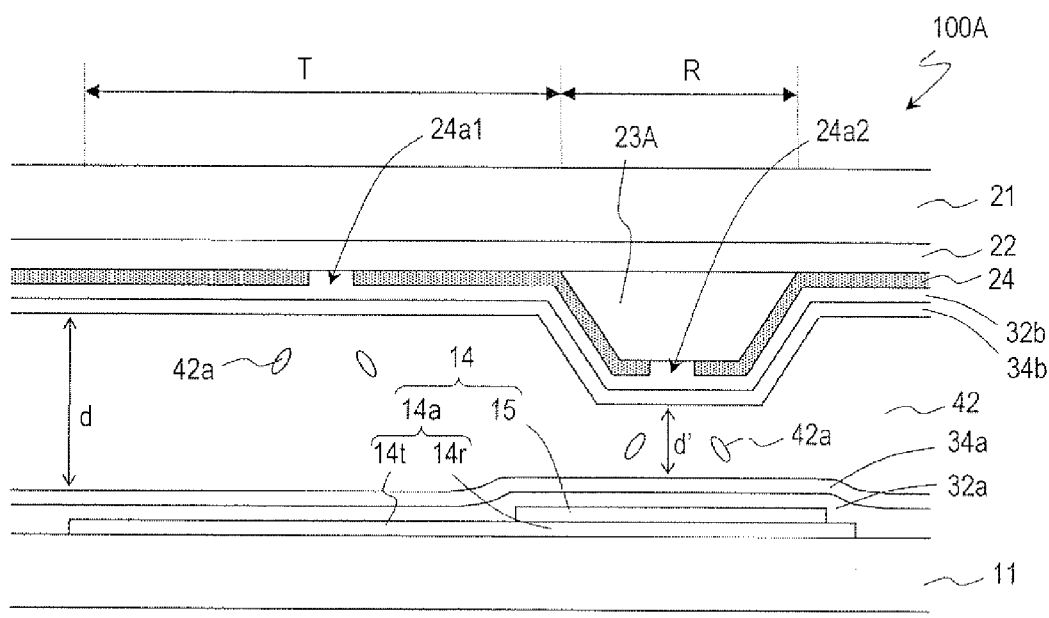
FIG. 1 is a schematic cross-sectional view of a liquid crystal display device 100A in an embodiment according to the present invention, which shows a cross-section taken along line I-I' in FIG. 2(a).
Figure 2:
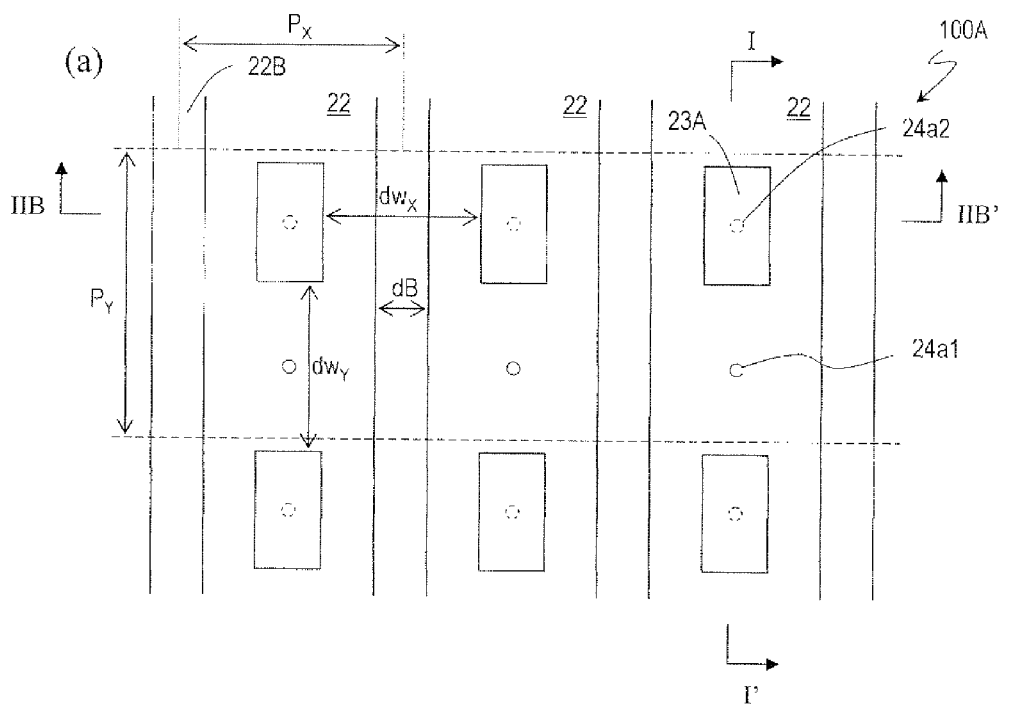
FIG. 2(a) is a schematic plan view of the liquid crystal display device 100A.
FIG. 2(b) is a schematic cross-sectional view thereof taken along line IIB-IIB' in FIG. 2(a).
Figure 2:
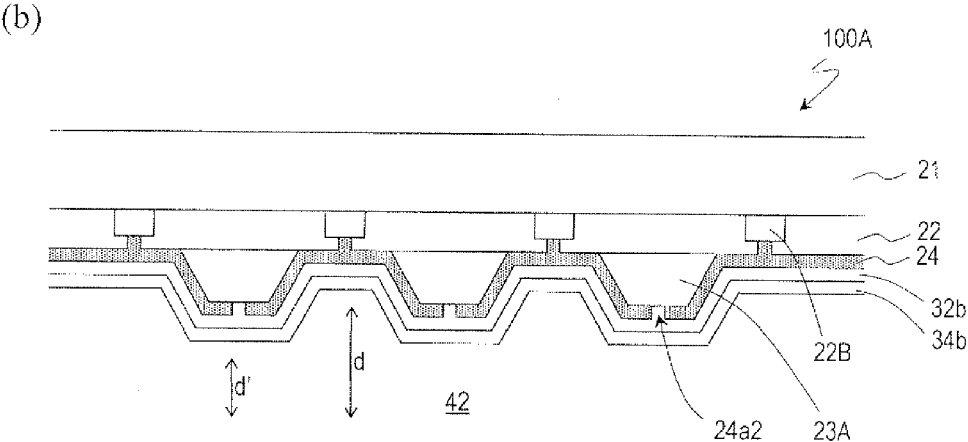

FIG. 1 is a schematic cross-sectional view of the liquid crystal display device 100A in the embodiment according to the present invention, and shows a cross-section taken along line I-I' in FIG. 2(a). FIG. 2(a) is a schematic plan view of the liquid crystal display device 100A, and FIG. 2(b) is a schematic cross-sectional view thereof taken along line IIB-IIB' in FIG. 2(a). FIG. 2 shows a structure of only a color filter substrate (the substrate on the viewer side). Hereinafter, elements having like functions will be represented by identical reference signs, and descriptions thereof may be occasionally omitted.

The liquid crystal display device 100A includes a pair of transparent substrates (e.g., glass substrates) 11 and 21 and a pair of polarizing plates (not shown) provided outer thereto and placed in crossed Nicols, and displays an image in a normally black mode. Between the substrate 11 or 21 and the respective polarizing plate, a ¼-wave plate may be provided. Each of the pixels include a liquid crystal layer 42 containing a nematic liquid crystal material (liquid crystal molecules 42a) having a negative dielectric anisotropy, and a pixel electrode 14 and a counter electrode 24 facing each other with the liquid crystal layer 42 interposed therebetween. Between the pixel electrode 14 and the liquid crystal layer 42 and between the counter electrode 24 and the liquid crystal layer 42, a pair of vertical alignment film 32a and 32b are provided respectively. On surfaces of the alignment film 32a and 32b on the liquid crystal layer 42 side, a pair of alignment sustaining layers 34a and 34b formed of a photopolymerization product (typically, an ultraviolet polymerization product) are formed respectively. The thickness of the liquid crystal layer 42 is regulated by spacers (not shown).

As shown in FIG. 1, the pixel electrode 14 formed on the substrate 11 includes a reflective pixel electrode 15 for reflecting visible light and a transparent pixel electrode 14t for transmitting visible light. The transparent pixel electrode 14t is formed of a transparent conductive film 14a which is formed of, for example, an ITO (indium tin oxide) film or an IZO (indium zinc oxide) film. The reflective pixel electrode 15 is formed of a metal film having a high reflectance, for example, aluminum. As shown in FIG. 1 as an example, the reflective pixel electrode 15 may be formed in contact with the transparent conductive film 14a. Alternatively, the reflective pixel electrode 15 may be connected to a drain of a TFT (not shown) via a drawing line which is separately provided. In the case where the transparent pixel electrode 14t and the reflective pixel electrode 15 are provided in contact with each other, it is sufficient that either one of these pixel electrodes is connected to the drain of the TFT (not shown). The reflective pixel electrode 15 defines a reflective region R for providing display in a reflection mode, and the transparent pixel electrode 14t defines a transmissive region T for providing display in a transmission mode.

A portion 14r of the transparent conductive film 14a which acts as a part of the reflective pixel electrode 15 and a portion of the transparent conductive film 14a acting as the transparent pixel electrode 14t may be each formed to have a generally rectangular shape by providing a cutout portion (not shown) between the transparent pixel electrode 14t and the reflective pixel electrode 15. By forming the pixel electrode 14 to have such an external shape, an oblique electric field formed at edges of the pixel electrode 14 can stably form a liquid crystal domain in which the liquid crystal molecules assume a radially inclined alignment (axially symmetrical alignment) in each of the reflective region R and the transmissive region T. An opening 24a1 formed in the transmissive region T of the counter electrode 24 and an opening 24a2 formed in the reflective region R of the counter electrode 24 each act to fix the central axis of the radially inclined alignment (described later with reference to FIG. 7 and FIG. 8). As shown, for example, in FIG. 2(a), the openings 24a1 and 24a2 are generally circular, but are not limited to having such a shape. The applicant of the present application refers to a liquid crystal display device having such an alignment as a CPA (Continuous Pinwheel Alignment) mode, and applies the CPA mode to a small or medium size liquid crystal display device of a VA (Vertical Alignment) mode. Needless to say, the liquid crystal display device in the embodiment according to the present invention is not limited to a liquid crystal display device of the CPA mode and is applicable to a wide range of known transreflective type liquid crystal display devices. The liquid crystal display device of the CPA mode is described in, for example, Sharp Technical Journal, No. 80, August, 2001, pp. 11-14.

On the substrate 21 located on the viewer side, a color filter layer 22, a transparent resin layer 23A and the counter electrode 24 are formed. Between the pixels in the color filter layer 22, a black matrix (light shielding portion) 22B is provided (see FIG. 2). The black matrix 22B defines the width of the pixels in the row direction.

In the transreflective type liquid crystal display device 100A, it is preferable that a thickness d' of the liquid crystal layer 42 in the reflective region R is 0.3 times or greater and less than 0.6 times a thickness d of the liquid crystal layer 42 in the transmissive region T. It is more preferable that the thickness d' is about 0.5 times the thickness d. Light used for display in the transmission mode is light emitted from the backlight (not shown) located on a rear surface of the substrate 11 and transmitted through the liquid crystal layer 42. By contrast, light used for display in the reflection mode is light incident from the substrate 21 side and passed through the liquid crystal layer 42 twice. Therefore, by setting the thickness d' of the liquid crystal layer 42 in the reflective region R to about half of the thickness d of the liquid crystal layer 42 in the transmissive region T, the voltage-transmittance characteristic of the reflective region R and the voltage-transmittance characteristic of the transmissive region T can be matched to each other.

The liquid crystal display device 100A includes protrusions provided in correspondence with the reflective regions R of the substrate 21, and adjusts the thickness d' of the liquid crystal layer 42 in the reflective regions R by means of the protrusions. Each pixel includes one reflective region R. The protrusions are formed of a transparent resin layer 23A provided on the substrate 21 on the liquid crystal layer 42 side. For the sake of simplicity, the protrusions are represented by the same reference sign as the transparent resin layer 23A. The transparent resin layer 23A may be provided with a function of diffusing and reflecting (or scattering) light. This can be realized by forming the transparent resin layer 23A of a transparent resin material containing particles, having a different refractive index from that of the transparent resin material, dispersed therein.

With the structure in this example, the protrusions 23A are formed on the substrate 21 on the liquid crystal layer 42 side using the transparent resin layer 23 provided on the substrate 21. Alternatively, the protrusions may be formed by providing a resin layer on the substrate 11 on the liquid crystal layer 42 side. In this case, for example, the resin layer may be provided between the reflective pixel electrode 15/transparent conductive film 14r provided in the reflective regions R and the substrate 11. The resin layer provided between the reflective pixel electrodes 15 and the substrate 11 does not need to be transparent. As disclosed in Patent Document 1 mentioned above, a surface of the reflective electrodes may be provided with convexed and concaved portions so as to diffuse and reflect (or scatter) light.

As shown in FIG. 2(a), in the liquid crystal display device 100A, two protrusions corresponding to any two pixels adjacent to each other in the row direction are separated from each other at the border between the pixels adjacent to each other in the row and column directions. A distance $dW_X$ between the two protrusions is larger than a distance dB between the two adjacent pixels (in this example, the width of the black matrix 22B). As described later, the distance $dW_X$ between two protrusions 23A corresponding to any two pixels adjacent to each other in the row direction preferably exceeds ⅕ of a pitch $P_X$ of the pixels in the row direction, and more preferably exceeds ¼ thereof. As can be seen from FIG. 2(a), a distance $dW_Y$ between two protrusions 23A corresponding to any two pixels adjacent to each other in the column direction is generally larger than the distance $dW_X$ between two protrusions 23A corresponding to any two pixels adjacent to each other in the row direction.

In the liquid crystal display device 100A, as described above, the distance $dW_X$ between two protrusions 23A corresponding to any two pixels adjacent to each other in the row direction is larger than the distance dB between two pixels adjacent to each other in the row direction. Therefore, even when the PSA technology is applied, light spots or stains are not generated.

Now, a method for forming the alignment sustaining layers 34a and 34b using the PSA technology will be described. A specific production method is described in Patent Documents 3 and 4. In this example, a liquid crystal panel was produced by a method substantially the same as the method described in Patent Document 4 (Example 5).

A liquid crystal display panel for the liquid crystal display device 100 is produced using a nematic liquid crystal material having a negative dielectric anisotropy which contains a photopolymerizable monomer in a proportion of 0.1% by mass or greater and 0.5% by mass or less. The photopolymerizable monomer used herein is a diacrylate or dimethacrylate monomer having a liquid crystal skeleton. The liquid crystal display panel has substantially the same structure as the liquid crystal display device 100A except that the liquid crystal material contains the monomer, that the alignment sustaining layers 34a and 34b are not formed, and that the polarizing plates are not provided.

The liquid crystal layer (containing the above-described monomer) of the liquid crystal display panel is irradiated with UV light (e.g., i-line at a wavelength of 365 nm; about 5.8 mW/cm$^2$) from the substrate 21 side and/or from the substrate 11 side for about 3 to 5 minutes in the state where a voltage (10 V), which is higher than a white display voltage (e.g., 4.5 V), is applied across the liquid crystal layer. When a sufficiently high voltage is applied across the liquid crystal layer, a domain in which directors are radially aligned (referred to as the "radially inclined alignment domain" or the "axially symmetrical alignment domain") is formed in the liquid crystal layer 42 by an electric field generated between the counter electrode 24 having the circular openings 24a1 and 24a2 and the pixel electrode 14. The UV irradiation polymerizes the monomer to generate an ultraviolet polymerization product. The ultraviolet polymerization product forms the alignment sustaining layers 34a and 34b for fixing the liquid crystal molecules 42a in the above-described alignment state. The alignment sustaining layers 34a and 34b are formed on the vertical alignment films 32a and 32b. In this step, it is preferable that the liquid crystal display panel is irradiated with UV light from the substrate 21 side in order to form the alignment sustaining layers 34a and 34b also in the reflective regions R. After this, the liquid crystal display panel is further irradiated with UV light in order to reduce the amount of the monomer remaining in the liquid crystal layer 42. For example, the liquid crystal display panel is irradiated with UV light of about 1.4 mW/cm$^2$ for about 1 to 2 hours using a black light. Such a series of steps is occasionally referred to as the "PSA process".

Figure 6:
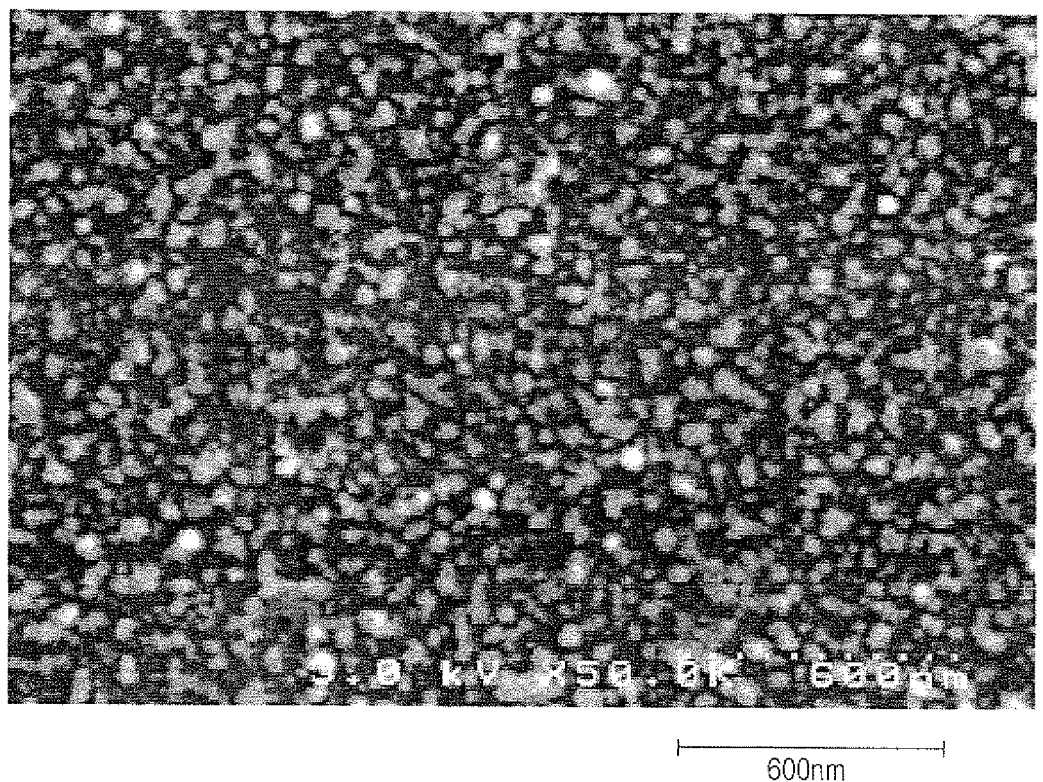
FIG. 6 shows an SEM image of an alignment sustaining layer included in a liquid crystal display device in an embodiment according to the present invention.

With reference to FIG. 6, a structure of an example the alignment sustaining layers 34a and 34b will be described. An SEM image shown in FIG. 6 is a result of an SEM observation of a surface of the alignment sustaining layer. Specifically, a sample of the liquid crystal display panel produced as described above was disassembled, the liquid crystal material was removed, and then a surface of the alignment sustaining layer of the resultant sample was washed with a solvent and observed by an SEM.

As can be seen from FIG. 6, the alignment sustaining layer contains particles of the ultraviolet polymerization product having a particle size of 50 nm or less. The ultraviolet polymerization product does not to need cover the entire surface of the alignment film, and the surface of the alignment film may be partially exposed. The liquid crystal molecules aligned in accordance with the electric field generated in the liquid crystal layer are fixed by the ultraviolet polymerization product, and so the alignment is sustained even in the absence of the electric field. After the alignment sustaining layers are formed on the vertical alignment films, the alignment sustaining layers regulate the pretilt directions of the liquid crystal molecules.

Figure 7:
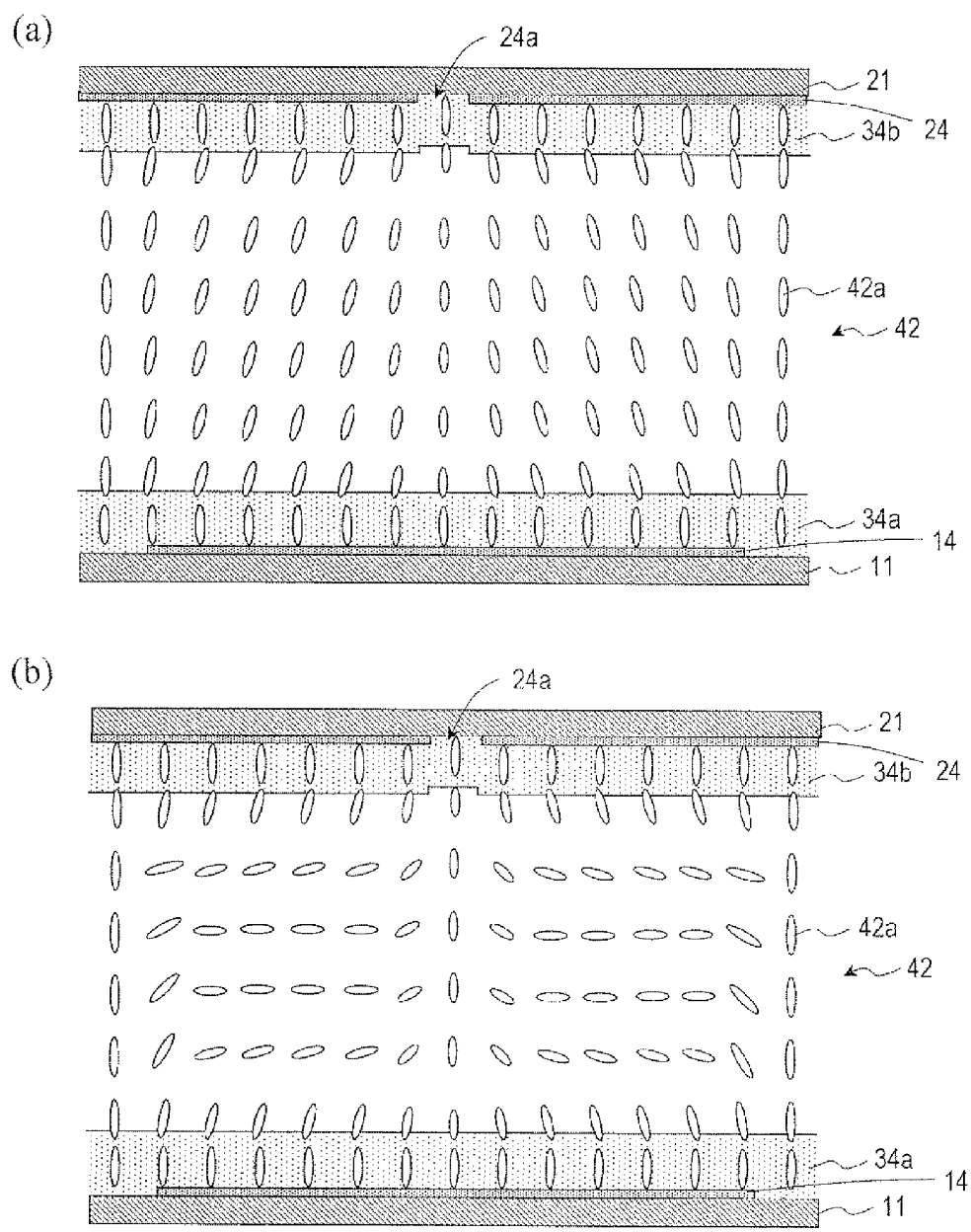
FIG. 7 schematically shows alignment states of liquid crystal molecules in a transmissive region T or a reflective region R of a liquid crystal display device in an embodiment according to the present invention.
Figure 8:
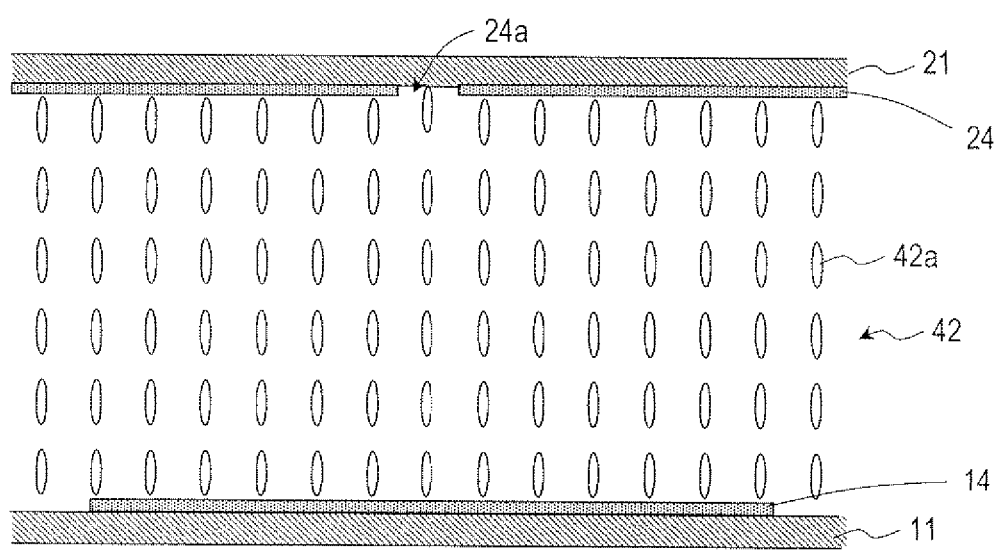
FIG. 8 schematically shows alignment states of liquid crystal molecules in a transmissive region T or a reflective region R of a liquid crystal display device with no alignment sustaining layer.
Figure 8:
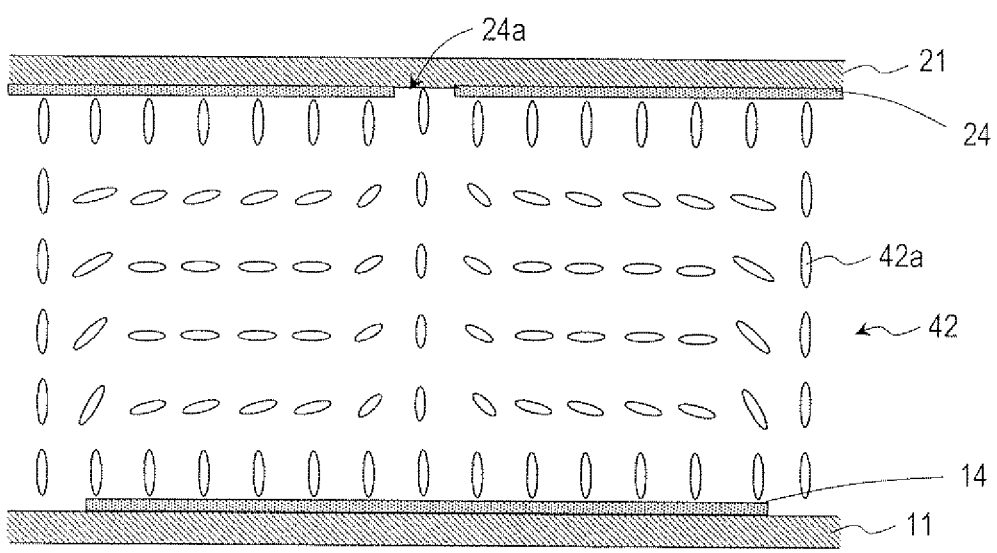

Now, with reference to FIG. 7 and FIG. 8, the functions of the alignment sustaining layers 34a and 34b will be described. FIG. 7 schematically shows the alignment states of the liquid crystal molecules in the transmissive region T or the reflective region R of the liquid crystal display device in the embodiment according to the present invention. FIG. 7(a) shows a black display state (in the absence of an applied voltage), and FIG. 7(b) shows a white display state (in the presence of an applied voltage). The opening formed in the counter electrode 24 is shown as the opening 24a. FIG. 8 schematically shows the alignment states of the liquid crystal molecules in a transmissive region T or a reflective region R of a liquid crystal display device with no alignment sustaining layer. FIG. 8(a) shows a black display state (in the absence of an applied voltage), and FIG. 8(b) shows a white display state (in the presence of an applied voltage). In FIG. 7 and FIG. 8, the vertical alignment films 32a and 32b are omitted.

First, in order to explain the alignment of the liquid crystal molecules 42a provided by the oblique electric field, FIG. 8 will be referred to. As shown in FIG. 8(a), in the absence of an applied voltage, the liquid crystal molecules 42a are vertically aligned by the vertical alignment films (not shown). By contrast, in the white display state, the alignment directions of the liquid crystal molecules 42a are regulated by an oblique electric field generated at edges of the pixel electrode 14 and an oblique electric field generated in the vicinity of the opening 24a of the counter electrode 24. The liquid crystal molecules 42a in the vicinity of the center of the liquid crystal layer are aligned such that the longer axes thereof are perpendicular to the electric field (because of the negative dielectric anisotropy of the liquid crystal molecules). As seen from the normal direction to the liquid crystal layer 42, the liquid crystal molecules 42a are aligned as inclined radially around the opening 24a as the center. As shown in FIG. 8(b), the liquid crystal molecules 42a in an area corresponding to the opening 24a are kept aligned vertically, and act as the central axis of the radially inclined alignment (axially symmetrical alignment (having symmetry)). The liquid crystal molecules 42a closest to the vertical alignment films (not shown) are under a strong anchoring effect of the vertical alignment films and so are aligned vertically to the surfaces of the vertical alignment films even in the white display state.

Now, FIGS. 7(a) and 7(b) will be referred to. The liquid crystal display device in the embodiment according to the present invention includes the alignment sustaining layers 34a and 34b. The alignment sustaining layers 34a and 34b act to fix the liquid crystal molecules 42a in the alignment which occurs when an electric field is applied. Specifically, when the liquid crystal molecules 42a are in the alignment state as shown in FIG. 8(b), the monomer is polymerized as described above to form the alignment sustaining layers 34a and 34b. The liquid crystal molecules are fixed in this alignment state.

As shown in FIG. 8(b), the liquid crystal molecules 42a closest to the vertical alignment films are under a strong anchoring effect, and therefore, are aligned vertically to the surfaces of the vertical alignment films even at a level of voltage as applied during light irradiation (e.g., a voltage of about 10 V, which is higher than the white display voltage). Thus, the liquid crystal molecules 42a fixed by the alignment sustaining layers 34a and 34b formed on the vertical alignment films only have a slight tilt (1° to 5°) from the vertical direction (pretilt angle of 85° to 89°) as schematically shown in FIG. 7(a). As can be seen from a comparison of FIG. 7(a) and FIG. 7(b), the alignment of the liquid crystal molecules 42a fixed by the alignment sustaining layers 34a and 34b does not change almost at all even when a voltage is applied.

The liquid crystal display device in the embodiment according to the present invention includes the alignment sustaining layers 34a and 34b, and therefore the liquid crystal molecules exhibit an alignment state of being pretilted in prescribed directions as shown in FIG. 7(a) even in the absence of an applied voltage. The alignment state at this point matches the alignment state of the liquid crystal molecules 42a which occurs in the white display state (in the presence of an applied voltage) shown in FIG. 7(b). As a result, the alignment of the liquid crystal molecules is advantageously stable even at low gray scale levels.

Figure 5:
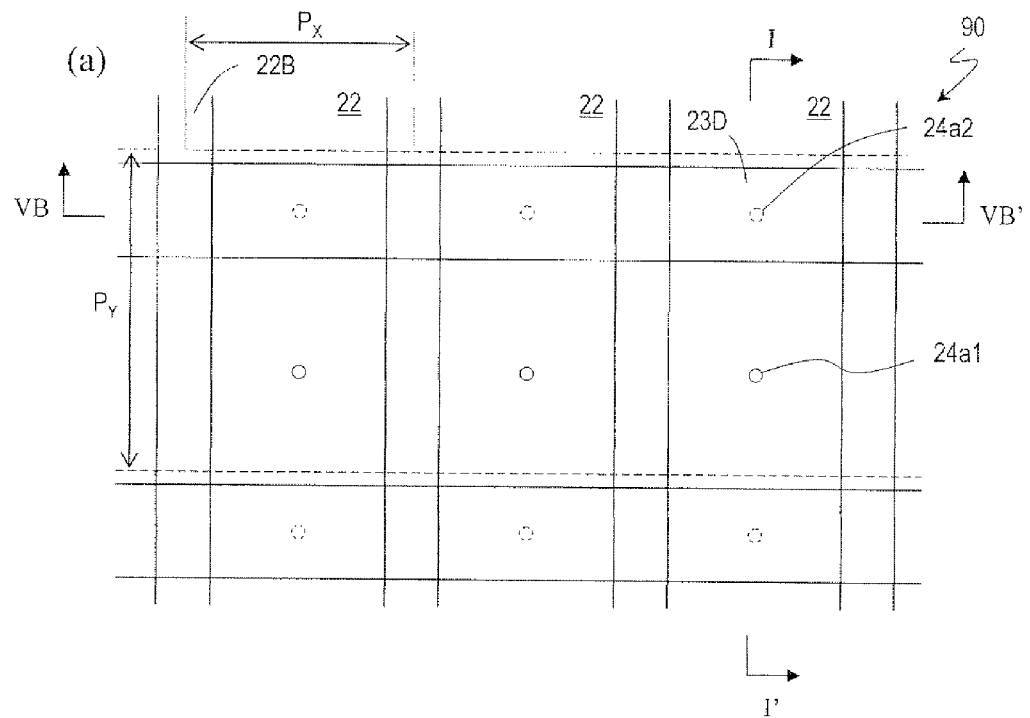
FIG. 5(a) is a schematic plan view of a liquid crystal display device 90 in a comparative example.
FIG. 5(b) is a schematic cross-sectional view thereof taken along line VB-VB' in FIG. 5(a).
Figure 5:
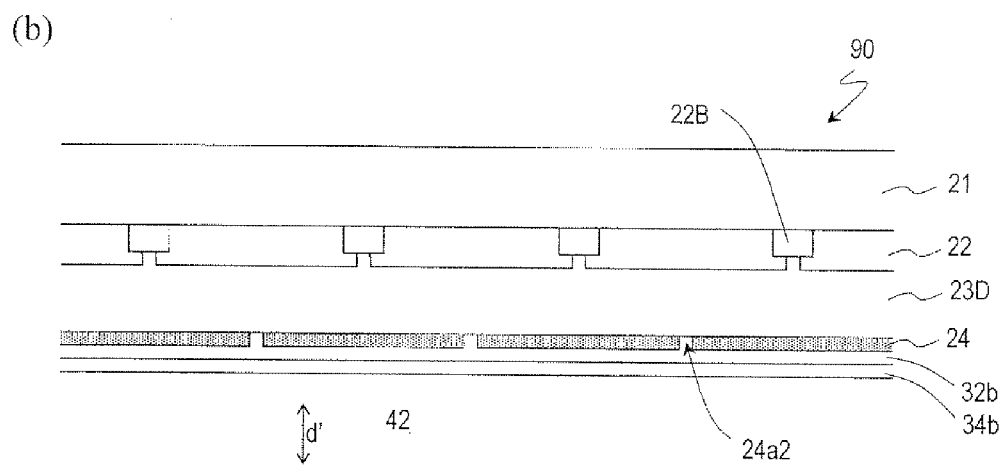

Now, with reference to FIG. 5, a problem with the PSA technology applied to a transreflective type liquid crystal display device having a multi-gap structure will be described.

FIG. 5(a) is a schematic plan view of a liquid crystal display device 90 in a comparative example, and FIG. 5(b) is a schematic cross-sectional view of the liquid crystal display device 90 taken along line VB-VB' in FIG. 5(a). A cross-sectional view taken along line I-I' in FIG. 5(a) is the same as FIG. 1.

Conventionally, as in the transreflective type liquid crystal display device 90 shown in FIG. 5(a), a transparent resin layer 23D forming protrusions is continuously formed in the row direction. In addition, as shown in FIG. 5(b), regions of the liquid crystal layer 42 having the small thickness d' are consecutively provided in the row direction. When the PSA technology is applied to a transreflective type liquid crystal display device having such a multi-gap structure, light spots or stains may be occasionally generated.

Recently, for injecting a liquid crystal material, a one drop filling method is widely used from the viewpoint of mass productivity. The drop filling method is carried out as follow. A drop of a liquid crystal material (in this example, a mixture of a nematic liquid crystal material and a photopolymerizable monomer) is applied to a substrate having a seal pattern drawn thereon (the substrate 11 or 21 having the vertical alignment film provided thereon) under a reduced atmosphere, and then this substrate is brought together with the other substrate. It is preferable that the liquid crystal material is dripped to the center of an active area (display area) or the vicinity thereof. The liquid crystal material is not limited to being dripped to one position and may be dripped to a plurality of positions. If the liquid crystal material is dripped to the vicinity of a sealed portion, the liquid crystal material contacts an uncured sealant (typically, a photocurable resin) or the time duration in which the liquid crystal material is in contact with the uncured sealant is extended. As a result, the liquid crystal material is contaminated with impurities.

By bringing together a pair of substrates, the gap between the substrates is narrowed and so the drops of the liquid crystal material are expanded. In a multi-gap structure, the liquid crystal material is expanded more rapidly in a portion having a smaller gap (the portion to be the reflective region R) and finally reaches a portion having a larger gap. Immediately before the gap is entirely filled with the liquid crystal material, reduced pressure air bubbles surrounded by the liquid crystal material are formed. The photopolymerizable monomer is distributed nonuniformly and is mainly present in the vicinity of the reduced pressure air bubbles (the concentration of the photopolymerizable monomer is higher in such an area than the other areas). When the photopolymerizable monomer is cured, a large lump of the polymerization product is formed. This lump of the polymerization product appears as a light spot in the display. The reason why the photopolymerizable monomer is mainly present in the vicinity of the reduced pressure air bubbles has not been clarified. However, it is considered light spots are generated for the above reason, because light spots are likely to be generated in portions where the reduced pressure air bubbles are formed (the last portions which are filled with the liquid crystal material), and because large lumps of the polymerization product (having a diameter of about several micrometers) are found as a result of an analysis of the portions where the light spots are generated. When the photopolymerizable monomer is mainly present in a certain area, large lumps of the polymerization product may not be always generated; but still the polymerization product is generated nonuniformly. As a result, the pretilt angles of the liquid crystal molecules are distributed nonuniformly. Such nonuniformity of the pretilt angles is visually recognized as stains (display nonuniformity).

As a result of various experiments performed by the present inventor, the following was found. In the case where the protrusions 23A are separated from each other at the border between the pixels adjacent to each other in the row direction and the distance $dW_X$ between the protrusions 23A is made larger than the distance dB between the adjacent pixels as in the liquid crystal display device 100A, the photopolymerizable monomer is prevented from being present nonuniformly in the direction in which the liquid crystal material flows and thus generation of light spots or stains can be suppressed. Hereinafter, a part of the experiments will be shown.

The following settings were made in the liquid crystal display device 100A: $P_Y$=110 μm, $P_X$=50 μm, dB=5 μm, d=3.6 μm, and $dW_X$=14 μm. d' was a variable. The results are shown in Table 1 below together with the results with the liquid crystal display device 90 in the comparative example. As long as the thickness d of the liquid crystal layer is in the range of 2.8 μm or greater and 5.0 μm or less, substantially the same results are obtained. Herein, only the example in which $dW_X/P_X$=0.28 is shown. It has been found as a result of various investigations that it is sufficient that $dW_X$ is about 9 μm is sufficient, and in general, generation of light spots can be sufficiently suppressed as long as $dW_X/P_X$=0.20 or greater.

TABLE 1

| d' | | 0.3 d | 0.5 d | 0.6 d | 0.75 d |
|---|---|---|---|---|---|
| Example | Presence/absence of light spots or stains | Absent | Absent | Absent | Absent |
| Comparative example | Brightness of light spots | XX | X | ○ | ○ |
| | Frequency of generation | Many are distributed in groups | Interspersed | Absent | Absent |

As shown in Table 1, in the example adopting the structure of the liquid crystal display device 100A, generation of light spots and stains is suppressed or prevented in the entire range of the thickness d' of the liquid crystal layer 42 in the reflective region R from 0.3 d to 0.75 d. By contrast, in the comparative example having the structure of the conventional liquid crystal display device 90, generation of light spots and stains cannot be prevented unless the thickness d' of the liquid crystal layer 42 in the reflective region R is 0.6 d or greater.

Namely, it is understood that as long as the conventional structure is adopted, a liquid crystal display device having a structure of d'=0.5 d for providing optimum display cannot be produced by the one drop filling method.

Figure 3:
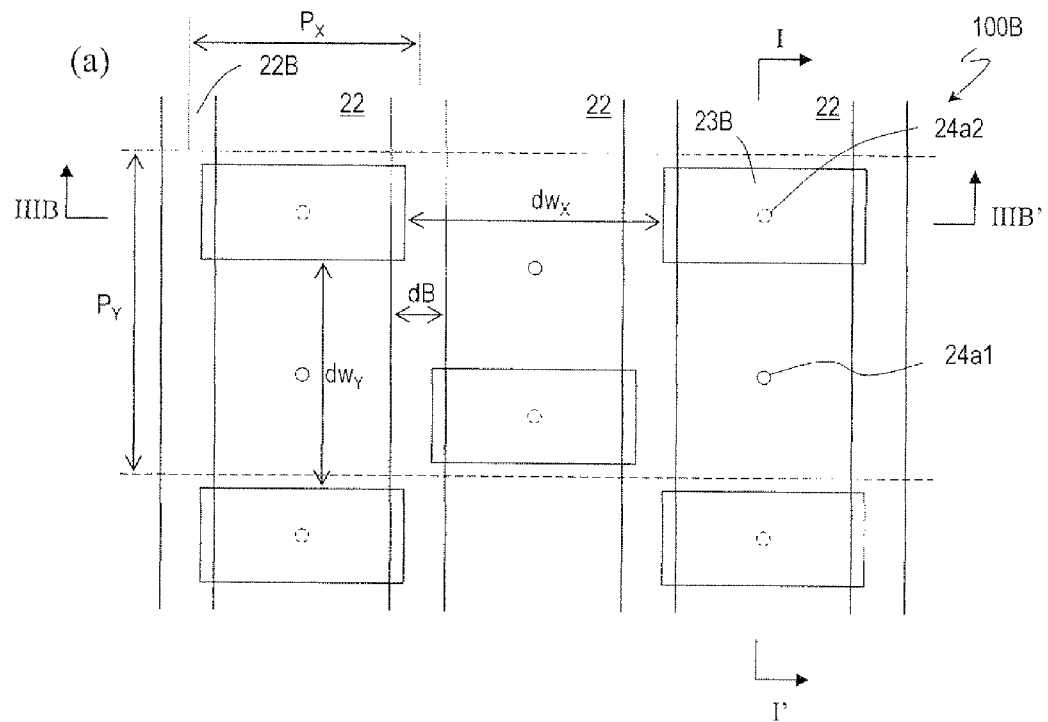
FIG. 3(a) is a schematic plan view of a liquid crystal display device 100B in another embodiment according to the present invention.
FIG. 3(b) is a schematic cross-sectional view thereof taken along line IIIB-IIIB' in FIG. 3(a).
Figure 3:
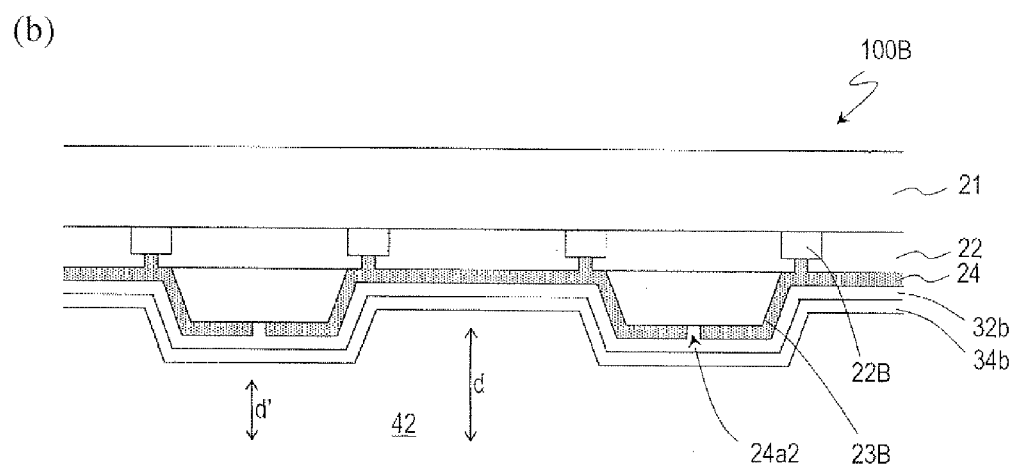

With reference to FIG. 3, a structure of a liquid crystal display device 100B in another embodiment according to the present invention will be described. FIG. 3(a) is a schematic plan view of the liquid crystal display device 100B, and FIG. 3(b) is a schematic cross-sectional view thereof taken along line IIIB-IIIB' in FIG. 3(a). A cross-sectional view taken along line I-I' in FIG. 3(a) is the same as FIG. 1.

In the liquid crystal display device 100B, as shown in FIG. 3(a), two protrusions (transparent resin layers) 23B corresponding to any two pixels adjacent to each other in the row direction are provided as being shifted with respect to each other in the column direction so as not to be adjacent to each other. Specifically, regarding any one row, the protrusions 23B are shifted at every other column (provided in a zigzag pattern). Even with such a structure, the above-described condition can be fulfilled. Namely, the distance between two protrusions 23B adjacent to each other in the row direction is larger than the distance between two pixels adjacent to each other in the row direction.

With this structure, the width of the protrusions 23B in the row direction can be made equal to, or larger than, the pitch $P_X$ of the pixels in the row direction. The alignment of the liquid crystal molecules is disturbed in the vicinity of the edges of each protrusion 23B. Therefore, by providing the edges of each protrusion 23B so as to overlap the black matrix 22B, reduction in the display quality can be suppressed.

Figure 4:
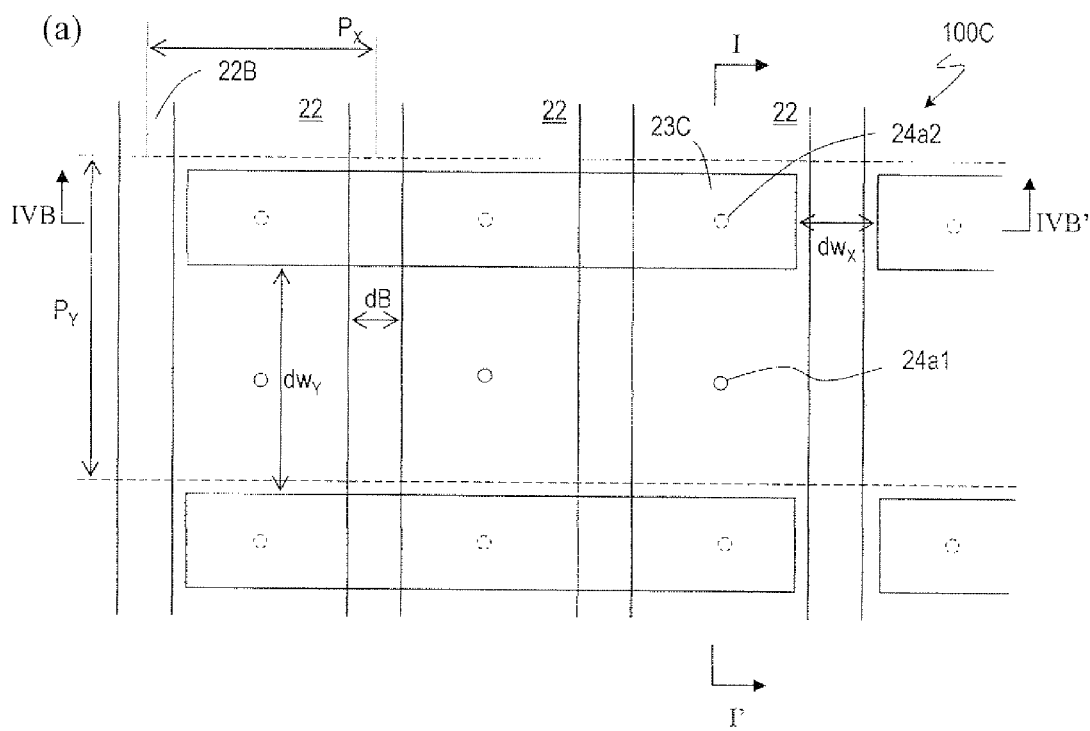
FIG. 4(a) is a schematic plan view of a liquid crystal display device 100C in still another embodiment according to the present invention.
FIG. 4(b) is a schematic cross-sectional view thereof taken along line IVB-IVB' in FIG. 4(a).
Figure 4:
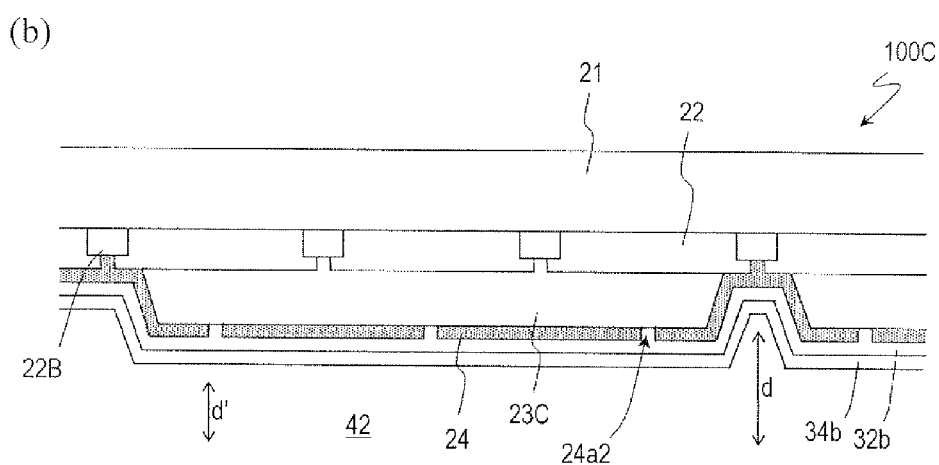

Now, with reference to FIG. 4, a structure of a liquid crystal display device 100C in still another embodiment according to the present invention will be described. FIG. 4(a) is a schematic plan view of the liquid crystal display device 100C, and FIG. 4(b) is a schematic cross-sectional view thereof taken along line IVB-IVB' in FIG. 4(a). A cross-sectional view taken along line I-I' in FIG. 4(a) is the same as FIG. 1.

In the liquid crystal display device 100C, as shown in FIG. 4(a), one continuous protrusion 23C is formed in correspondence with three pixels adjacent to each other in the row direction. The three pixels adjacent to each other in the row direction are, for example, pixels of three primary colors forming one color display pixel. The distance $dW_X$ between two protrusions 23C adjacent to each other in the row direction is larger than the distance dB between two adjacent pixels. As seen from this, it is not absolutely necessary to provide protrusions in correspondence with pixels in a one-to-one relationship as the protrusions 23A in the liquid crystal display device 100A or the protrusions 23B in the liquid crystal display device 100B. One continuous protrusion may be provided in correspondence with a plurality of pixels. In this example, the two protrusions 23C provided in correspondence with two pixels adjacent to each other in the row direction are adjacent to each other in the row direction. Alternatively, as the protrusions 23B in the liquid crystal display device 100B, two protrusions provided in correspondence with two pixels adjacent to each other in the row direction may be shifted with respect to each other in the column direction so as not to be adjacent to each other in the row direction.

Regarding FIG. 4(a), in the case where a B (blue) pixel, a G (green) pixel, an R (red) pixel and a B pixel are arranged sequentially from the left, it is preferable that the protrusions 23C adjacent to each other are separated from each other at the border between the R pixel and the B pixel. With such a structure, the influence of an alignment error, if occurred, between the color filter substrate and the TFT substrate can be made most unlikely to be exerted on the green pixel, which has the highest visibility. Therefore, reduction in the display quality can be advantageously suppressed. When $P_Y$=110 µm, $P_X$=50 µm, dB=5 µm, d=3.6 µm, and d'=0.5 d, as long as $dW_X$ is 9 µm or greater, generation of light spots and stains can be suppressed.

In this example, one continuous protrusion 23C is provided in correspondence with three pixels adjacent to each other in the row direction. The present invention is not limited to this. One continuous protrusion may be provided in correspondence with two pixels adjacent to each other in the row direction. Note that when one continuous protrusion is provided in correspondence with five or more pixels adjacent to each other in the row direction, substantially the same problem as that described above regarding the conventional liquid crystal display device 90 with reference to FIG. 5 may occur. Therefore, it is preferable that one continuous protrusion is provided in correspondence with less than five pixels adjacent to each other in the row direction.

INDUSTRIAL APPLICABILITY

The present invention is applicable to a wide range of transmission-reflection combination type liquid crystal display devices.

REFERENCE SIGNS LIST

| | |
|---|---|
| 11, 21 | Transparent substrate (glass substrate) |
| 14 | Pixel electrode |
| 14a | Transparent conductive film |
| 14r | Portion of the transparent conductive film acting as a part of the reflective pixel electrode |
| 14t | Transparent pixel electrode |
| 15 | Reflective pixel electrode |
| 22 | Color filter film |
| 22B | Black matrix |
| 23A, 23B, 23C, 23D | Transparent resin layer (protrusion) |
| 24 | Counter electrode |
| 24a, 24a1, 24a2 | Opening |
| 32a, 32b | Vertical alignment film |
| 34a, 34b | Alignment sustaining layer |
| 42 | Liquid crystal layer |
| 42a | Liquid crystal molecule |
| 100A, 100B, 1000, 90 | Liquid crystal display device |

The invention claimed is:

1. A liquid crystal display device including a plurality of pixels arranged in a matrix having rows and columns, each of the plurality of pixels having a reflective region for providing display in a reflection mode and a transmissive region for providing display in a transmission mode, the liquid crystal display device comprising:

a first substrate and a second substrate;

a liquid crystal layer provided between the first substrate and the a second substrate;

pixel electrodes formed on the first substrate on the liquid crystal layer side and each including a reflective pixel electrode and a transparent pixel electrode;

a counter electrode formed on the second substrate on the liquid crystal layer side;

a pair of vertical alignment films respectively provided between the pixel electrodes and the liquid crystal layer and between the counter electrode and the liquid crystal layer; and a pair of alignment sustaining layers respectively provided on surfaces of the pair of vertical alignment films on the liquid crystal layer side, the pair of alignment sustaining layers being formed of a photopolymerization product;

wherein:

the first substrate or the second substrate has a plurality of protrusions provided in correspondence with the reflective regions of the plurality of pixels and protruding toward the liquid crystal layer;

regarding any of the rows, a distance between two of the plurality of protrusions adjacent to each other in a row direction is larger than a distance between two of the plurality of pixels adjacent to each other in the row direction; and wherein two of the plurality of protrusions provided in correspondence with two pixels adjacent to each other in the row direction among the plurality of pixels are provided as being shifted with respect to each other in a column direction so as not to be adjacent to each other in the row direction.

2. The liquid crystal display device of claim 1, wherein each of the plurality of protrusions is provided in correspondence with either one of the plurality of pixels.

3. The liquid crystal display device of claim 1, wherein each of the plurality of protrusions is provided in correspondence with at least two pixels adjacent to each other among the plurality of pixels.

4. The liquid crystal display device of claim 1, wherein a distance between any two protrusions adjacent to each other among the plurality of protrusions exceeds ⅕ of a pitch of the plurality of pixels in the row direction.

5. The liquid crystal display device of claim 1, wherein a width of each of the plurality of protrusions in the row direction is equal to, or larger than, the pitch of the plurality of pixels in the row direction.

6. The liquid crystal display device of claim 1, wherein the plurality of protrusions are formed of a transparent resin layer provided on the second substrate.

7. The liquid crystal display device of claim 1, wherein the plurality of protrusions are formed of a resin layer provided on the first substrate.

8. The liquid crystal display device of claim 1, wherein the liquid crystal layer in the reflective region has a thickness which is 0.3 times or greater and less than 0.6 times a thickness of the liquid crystal layer in the transmissive region.

* * * * *